United States Patent
Huang

(10) Patent No.: US 6,252,839 B1
(45) Date of Patent: Jun. 26, 2001

(54) CD-ROM READER MECHANISM

(75) Inventor: Chien-Yi Huang, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/258,891

(22) Filed: Mar. 1, 1999

(51) Int. Cl.[7] .......................... G11B 33/02; G11B 17/00
(52) U.S. Cl. .......................... 369/77.1; 369/247
(58) Field of Search .......................... 369/75.1, 75.2, 369/77.1, 77.2, 247, 263

(56) References Cited

U.S. PATENT DOCUMENTS

| | | | |
|---|---|---|---|
| 4,101,134 | * 7/1978 | Smith, III et al. | 274/23 |
| 5,123,005 | * 6/1992 | Kurosu | 369/77.1 |
| 5,737,304 | * 4/1998 | Soga et al. | 369/247 |
| 5,822,290 | * 10/1998 | Lee | 369/75.2 |
| 6,122,145 | * 9/2000 | Hoyle | 360/133 |

\* cited by examiner

*Primary Examiner*—Brian E. Miller
*Assistant Examiner*—Kenneth W. Fields
(74) *Attorney, Agent, or Firm*—Rosenberg, Klein & Lee

(57) ABSTRACT

A CD-ROM reader mechanism includes a movable inner frame supporting a reader device thereon and being movably received in a fixed outer frame. At least one pair of flexible hinges are integrally formed between the inner frame and the outer frame at opposite sides to pivotally support the inner frame in the outer frame thereby allowing a front end of the inner frame to move between an upper position where the reader device is allowed to access an optic disk and a lower position where the reader device is moved away from the optic disk. The flexible hinges each include an undulated structure made of a deformable material. The undulated structure has a plurality of cavities therein which allow the structure to collapse for serving as a hinge.

3 Claims, 4 Drawing Sheets

CD-ROM READER MECHANISM

FIELD OF THE INVENTION

The present invention generally relates to a CD-ROM, and in particular to a reader mechanism of a CD-ROM.

BACKGROUND OF THE INVENTION

CD-ROMs have been widely used in multi-media apparatus for reading digitized information from an optic disk. The CD-ROM comprises a reader device which is movable toward/away from the optic disk in order to read the information therefrom. A conventional mechanism for moving the CD-ROM reader head is shown in FIG. 5 of the attached drawings, comprising a movable inner frame B on which a reader device A is fixed. The movable inner frame B is arranged in an outer frame C and pivotally supported thereby by means of pivots 1B extending from the inner frame B for being received in pivot holes 1C defined in the outer frame C. Each pivot 1B is retained in the corresponding pivot hole 1C by a bolt 2C. The inner frame B is movably coupled to a curved track member D. The curved track member D is movable in a horizontal direction by means of a motor E via gears 1D, 2D and converts the horizontal movement thereof into a vertical movement of the inner frame B thereby rotating the inner frame B about the pivots 1B. The reader device A that is supported on the inner frame B is moved between a working position (FIG. 7) where the reader head A is close to an optic disk (not labeled) for reading information therefrom and a standby position (FIG. 6) where the reader device A is moved away from the optic disk.

In the conventional CD-ROM, the inner frame B and the outer frame C are separate so that it requires an assembling step to assemble the inner frame B and the outer frame C together. This increases costs. Furthermore, it also requires a careful consideration of the assembling sequence among the inner frame B, the curved track member D and gears D1, D2. This complicates the manufacturing process.

In addition, plays or clearances caused by manufacturing tolerances may be present between the pivots 1B and the corresponding pivot holes 1C which may lead to vibration of the inner frame B during the operation of the CD-ROM and may even generate noise.

It is thus desirable to have a reader mechanism of a CD-ROM which overcomes the above problems.

SUMMARY OF THE INVENTION

Accordingly, an object of the present invention is to provide a reader mechanism of a CD-ROM wherein a movable inner frame and a fixed outer frame are integrated together as a single unit for simplifying assembling process of the CD-ROM.

Another object of the present invention is to provide a reader mechanism of a CD-ROM wherein no vibration of a movable frame may be caused due to manufacturing tolerances.

A further object of the present invention is to provide a reader mechanism of a CD-ROM having low manufacturing costs.

To achieve the above objects, in accordance with the present invention, there is provided a CD-ROM reader mechanism comprising a movable inner frame supporting a reader device thereon and being movably received in a fixed outer frame. At least one pair of flexible hinges are integrally formed between the inner Fame and the outer frame at opposite sides to pivotally support the inner frame in the outer frame thereby allowing a front end of the inner frame to move between an upper position where the reader device is allowed to access an optic disk and a lower position where the reader device is moved away from the optic disk. The flexible hinges each include an undulated structure made of a deformable material. The undulated structure has a plurality of cavities therein which allow the structure to collapse for serving as a hinge.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
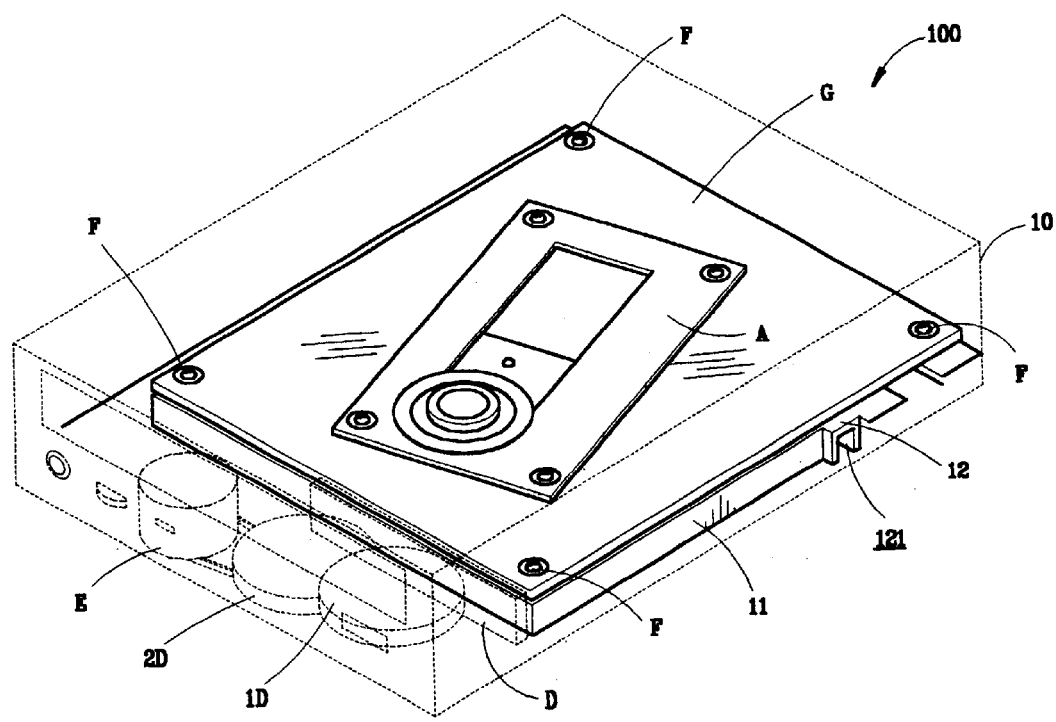
FIG. 1 is a perspective view of a CD-ROM reader mechanism in accordance with the present invention.
Figure 2:
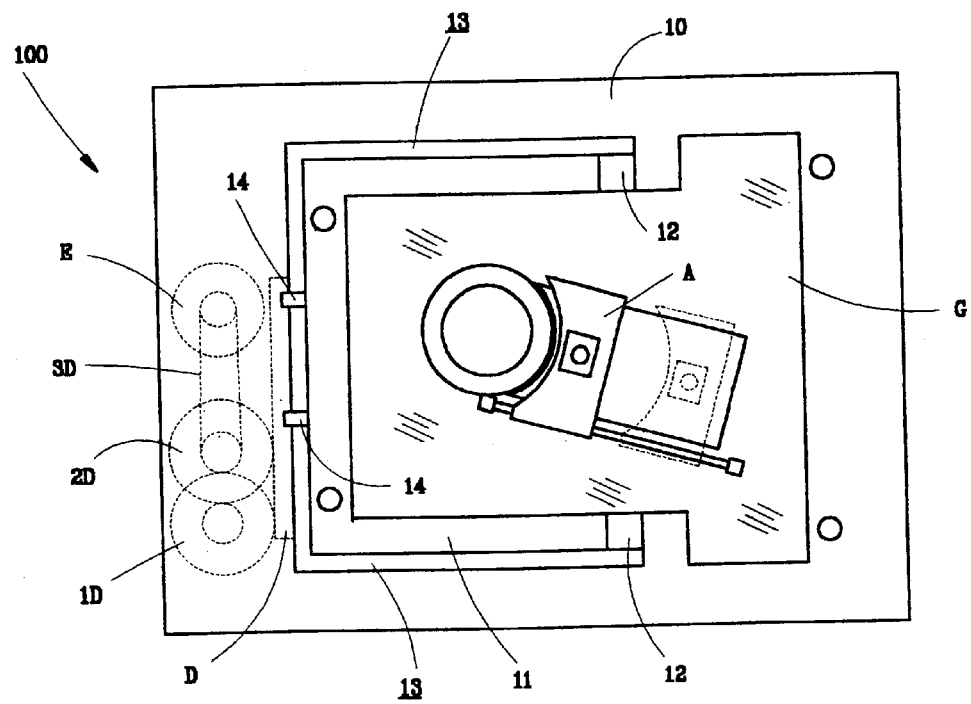
FIG. 2 is a top plan view of the CD-ROM reader mechanism of the present invention.
Figure 3:
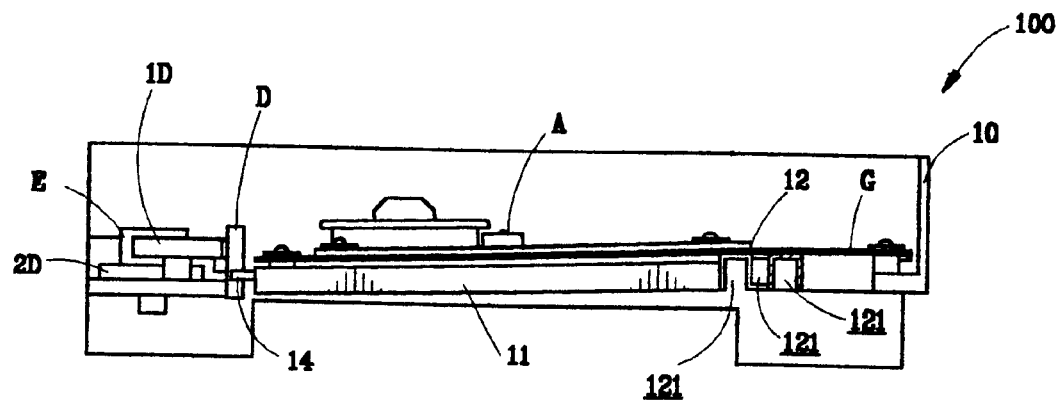
FIG. 3 is a side elevational view of the CD-ROM reader mechanism of the present invention showing an inner frame thereof at a lower position.

With reference to the drawings and in particular to FIGS. 1–3, wherein a CD-ROM is schematically shown and designated by reference numeral 100, the CD-ROM 100 comprises a fixed outer frame 10 in which a reader mechanism in accordance with the present invention is arranged. The reader mechanism comprises a movable inner frame 11 movably disposed in the outer frame 10. As shown in FIG. 2, the inner frame 11 is coupled to the outer frame 10 by means of two opposite flexible hinges 12 which pivotally support the inner frame 11 inside the outer frame 10. In accordance with the present invention, the outer frame 10, the flexible hinges 12 and the inner frame 11 are integrally formed as a single unit.

A reader device A is mounted on and supported by the inner frame 11. The reader device A may be mounted to the inner frame 11 by any known means. In the embodiment illustrated, the reader device A is supported on a pad G which is in turn fixed to the inner frame 11 by means of bolts F.

Figure 4:
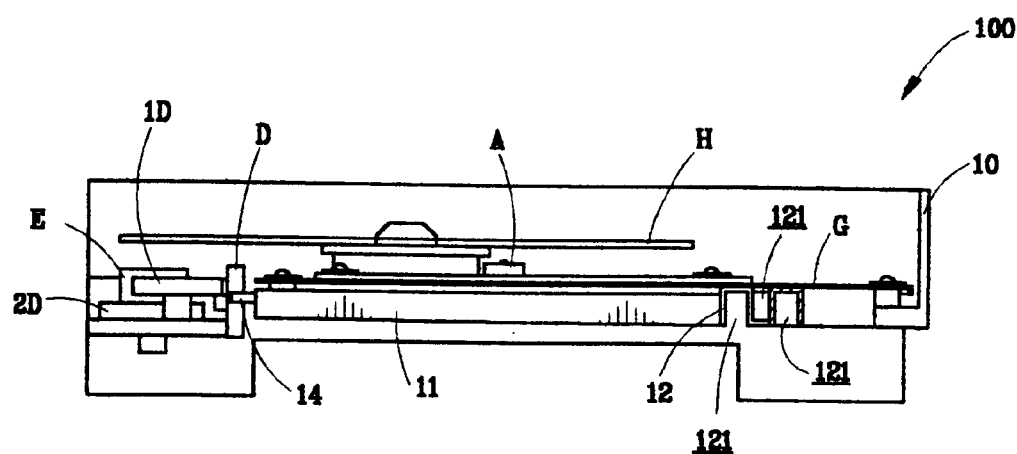
FIG. 4 is view similar to FIG. 3, but showing the inner frame at an upper position.
Figure 5:
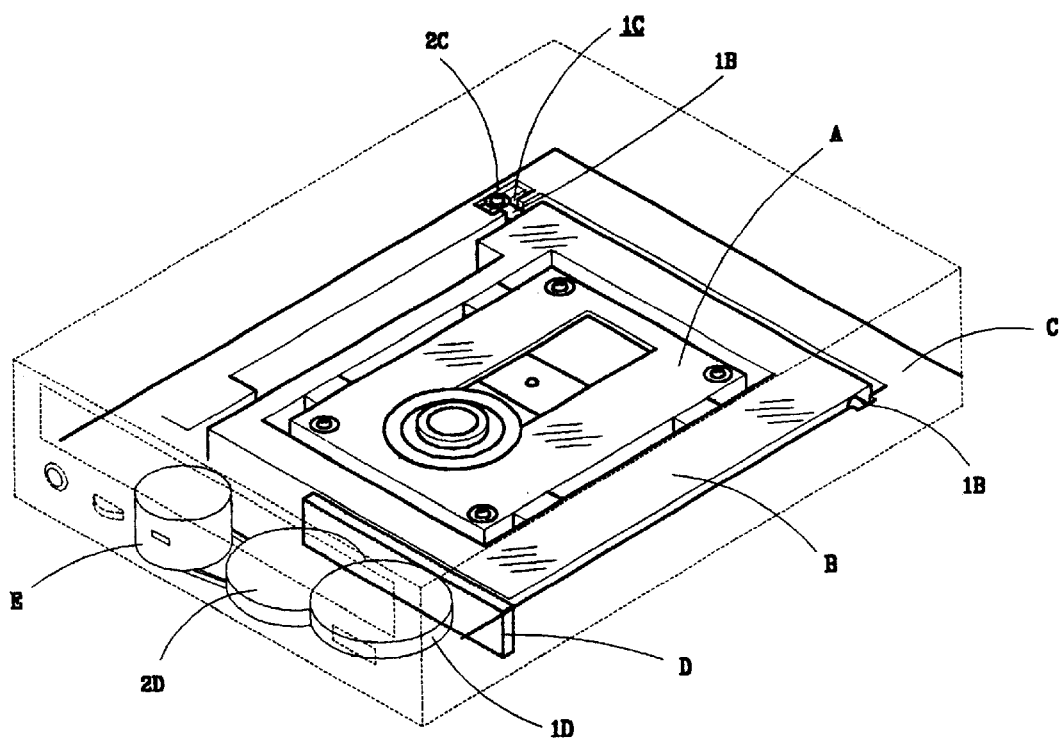
FIG. 5 is a perspective view of a conventional CD-ROM reader mechanism.
Figure 6:
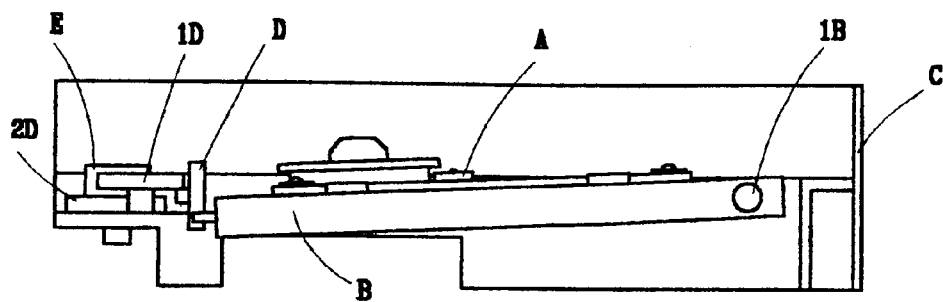
FIG. 6 is a side elevational view of the conventional CD-ROM reader mechanism showing an inner frame thereof at a lower position thereof.
Figure 7:
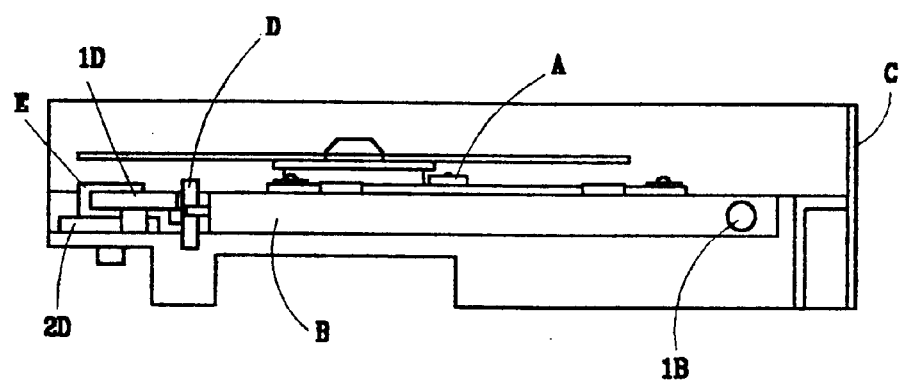
FIG. 7 is a side elevational view of the conventional CD-ROM reader mechanism showing the inner frame thereof at an upper position thereof.

In the embodiment illustrated, each flexible hinge 12 comprises an undulated structure (as best seen in FIGS. 3 and 4) made of a deformable material. The undulated structure defines a number of cavities 121 therebetween which allow the structure to deform in serving as a hinge whereby, with a gap 13 present between the inner frame 11 and the outer frame 10, a front end of the inner frame 11 is allow to rotatable about the flexible hinges 12 with respect to the outer frame 10 between an upper position as shown in FIG. 3 and a lower position as shown in FIG. 4.

Replacing the conventional pivots with the flexible hinges eliminates vibration of the inner frame 11 during the operation of the CD-ROM 100 for no play or clearance may exist in the flexible hinge.

The inner frame 10 comprises two guide posts 14 extending from the front end thereof and drivingly and movably coupled to a curved track member D. The curved track member D is driven by a motor E via gears 1D, 2D which are coupled to the motor E by a belt 3D to move in a horizontal direction. The horizontal movement of the curved track member D is converted into a movement of the front end of the inner frame 11 in a vertical direction via the coupling between the posts 14 and the curved track member D by means of the rotation of the inner frame 11 about the flexible hinges 12 thereby moving the inner frame 11 between the upper position and the lower position.

The structure and operation of the curved track member D are known so that no detailed discussion is needed herein.

As shown in FIG. 3, when at the lower position, the inner frame 11 moves the reader device A to a far-away position to allow the deposition or removal of an optic disk. When an optic disk H is deposited into the CD-ROM 100, the motor E is actuated to drive the inner frame 11 to the upper position which allows the reader device A to access the optic disk H as shown in FIG. 4.

The use of the flexible hinges not only integrates the inner frame and the outer frame together as a single unit which simplifies the assembling process and reduces costs, but also eliminates mechanical play therebetween thereby overcoming the vibration problem of the inner frame 11 during the operation of the CD-ROM 100 caused thereby.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A support apparatus for a CD-ROM reader comprising:

(a) an outer frame;

(b) a longitudinally extended inner frame for supporting the CD-ROM reader received within a space peripherally defined by said outer frame, said inner frame being displaceable relative to said outer frame member in substantially pivotal manner between upper and lower positions;

(c) at least a pair of flexible hinges deflectably joining laterally opposed sides of said inner frame to said outer frame, each said flexible hinge including a plurality of integrally formed undulated portions, adjacent ones of said undulated portions being longitudinally offset to define therebetween a laterally extending cavity; and, (d) an actuation assembly coupled to said inner frame for actuating said displacement thereof between said upper and lower positions.

2. The support assembly as recited in claim 1 wherein said undulated portions of each said flexible hinge extend laterally in parallel.

3. The support assembly as recited in claim 1 wherein each said flexible hinge includes a first of said undulated portions joined integrally to said inner frame, and a second of said undulated portions joined integrally to said outer frame.

* * * * *